United States Patent
Hong

(10) Patent No.: US 10,288,765 B2
(45) Date of Patent: May 14, 2019

(54) PHOTOELECTRIC SENSOR HAVING DRIVING PULSE GENERATING UNIT AND CONTROL METHOD THEREOF

(71) Applicant: OMRON Corporation, Kyoto (JP)

(72) Inventor: Qi Hong, Shanghai (CN)

(73) Assignee: OMRON Corporation, Kyoto (JP)

( * ) Notice: Subject to any disclaimer, the term of this patent is extended or adjusted under 35 U.S.C. 154(b) by 190 days.

(21) Appl. No.: 15/384,325

(22) Filed: Dec. 20, 2016

(65) Prior Publication Data
US 2017/0248735 A1   Aug. 31, 2017

(30) Foreign Application Priority Data
Feb. 29, 2016   (CN) .......................... 2016 1 0110157

(51) Int. Cl.
| | |
|---|---|
| *G01J 1/44* | (2006.01) |
| *G01V 8/10* | (2006.01) |
| *G01V 8/12* | (2006.01) |

(52) U.S. Cl.
CPC .................. *G01V 8/12* (2013.01); *G01J 1/44* (2013.01); *G01V 8/10* (2013.01)

(58) Field of Classification Search
CPC ..... G01V 8/12; G01V 8/10; G01J 1/44; G01J 1/42; G01J 2001/4238; G01J 2001/4242
See application file for complete search history.

(56) References Cited

U.S. PATENT DOCUMENTS

| | | | |
|---|---|---|---|
| 5,331,150 A | 7/1994 | Marsh | |
| 5,416,316 A * | 5/1995 | Kappeler | .................. G01V 8/12 250/221 |
| 2007/0098409 A1 | 5/2007 | Maruyama | |

(Continued)

FOREIGN PATENT DOCUMENTS

| | | |
|---|---|---|
| DE | 4141468 | 6/1993 |
| EP | 2796894 | 10/2014 |

(Continued)

OTHER PUBLICATIONS

"Office Action of Japan Counterpart Application", with English translation thereof, dated Jan. 30, 2018, p. 1-p. 7.

(Continued)

*Primary Examiner* — Que Tan Le
*Assistant Examiner* — Jennifer D Bennett
(74) *Attorney, Agent, or Firm* — JCIPRNET

(57) ABSTRACT

A photoelectric sensor and a control method thereof are provided, the photoelectric sensor includes a driving pulse generating unit, generating a driving pulse of different cycles; a light-emitting part, receiving the driving pulse to emit light; a light receiving part, receiving the light reflected by a detected object to generate a light receiving signal; an output unit, processing the light receiving signal to output a detection signal; and a control unit, controlling the driving pulse generating unit to generate a first driving pulse of a sleep cycle in usual, and triggered by a variation of the detection signal to control the driving pulse generating unit to generate a specified number of second driving pulses of a duty cycles, the duty cycle is formed by two or more specific cycles, an average of the specific cycles serves as the duty cycle, and the duty cycle is shorter than the sleep cycle.

10 Claims, 4 Drawing Sheets

(56) References Cited

U.S. PATENT DOCUMENTS

| | | | |
|---|---|---|---|
| 2011/0235871 A1* | 9/2011 | Byren | G06K 9/00033 |
| | | | 382/124 |
| 2012/0181338 A1* | 7/2012 | Gao | G06K 7/12 |
| | | | 235/455 |
| 2015/0002028 A1* | 1/2015 | Chen | H05B 33/0848 |
| | | | 315/153 |
| 2015/0226853 A1* | 8/2015 | Seo | G01S 17/89 |
| | | | 356/4.01 |

FOREIGN PATENT DOCUMENTS

| | | |
|---|---|---|
| EP | 2983009 | 2/2016 |
| JP | S62-139411 | 6/1987 |
| JP | H06-117922 | 4/1994 |
| JP | H06-209250 | 7/1994 |
| JP | 2008-298653 | 12/2008 |
| JP | 2014-131165 | 7/2014 |

OTHER PUBLICATIONS

"Office Action of European Counterpart Application," dated May 18, 2018, p. 1-p. 5.

"Search Report of Europe Counterpart Application", dated Jul. 27, 2017, p. 1-p. 11, in which the listed references were cited.

\* cited by examiner

PHOTOELECTRIC SENSOR HAVING DRIVING PULSE GENERATING UNIT AND CONTROL METHOD THEREOF

CROSS-REFERENCE TO RELATED APPLICATION

This application claims the priority benefit of China patent application no. 201610110157.9, filed on Feb. 29, 2016. The entirety of the above-mentioned patent application is hereby incorporated by reference herein and made a part of this specification.

BACKGROUND OF THE INVENTION

Field of the Invention

The invention relates to a photoelectric sensor and a control method of the photoelectric sensor, and particularly relates to a photoelectric sensor capable of saving energy and a control method of the photoelectric sensor.

Description of Related Art

Generally, a photoelectric sensor applies an oscillation circuit to produce a light projecting pulse to periodically drive a light projecting element, and in an object detection region, a detected object blocks or reflects the light coming from the light projecting element, and a light receiving element cannot receive the light from the light projecting element or the light receiving element receives the light from the light projecting element to generate a light signal, and determines whether the detected object exists based on the light signal.

In the photoelectric sensor, a pulse generated by the oscillation circuit is generally a pulse with a fixed pulse width and fixed period. However, in recent years, the idea of energy saving draws more attention.

In order to achieve the effect of energy saving, a patent literature 1 (Japan patent No. 6-209250) discloses a photoelectric switch. In the photoelectric switch of the patent literature 1, an oscillation circuit used for producing the light projecting pulse is connected to a start detection circuit, where the start detection circuit is used for determining whether an environment where the photoelectric switch is located is suitable for detecting an object and a human body, etc. In case that the start detection circuit determines that the current environment is not suitable for the photoelectric switch to implement detection, the oscillation circuit produces a long first period T1, and in case that the start detection circuit determines that the current environment is suitable to implement the detection, the oscillation circuit produces a second period T2 shorter than the first period T1. In this way, by setting two different pulse periods, during the long first period T1, the energy consumed by a light-emitting device is decreased, so as to save the energy.

A patent literature 2 (U.S. Pat. No. 5,331,150A) discloses another photoelectric switch. In the photoelectric sensor, when a state of an optical path is changed, the oscillation circuit is changed from a state of producing the pulse with a long period to a state of producing the pulse with a short period, so as to achieve the effect of energy saving.

Moreover, an interference signal is a main reason causing a detection error of the photoelectric sensor, so that it is important to improve an anti-interference performance of the photoelectric sensor.

However, in the aforementioned patent literatures, there is no content related to anti-interference technique.

Patent literature 1: Japan patent No. 6-209250

Patent literature 2: U.S. Pat. No. 5,331,150A

SUMMARY OF THE INVENTION

The invention is directed to a photoelectric sensor, which is capable of saving energy and has good anti-interference performance.

In order to resolve the aforementioned problems, the invention provides a photoelectric sensor, and the photoelectric sensor includes a driving pulse generating unit, which is adapted to generate a driving pulse of different cycles; a light-emitting part, which is adapted to receive the driving pulse to emit a light corresponding to the driving pulse; a light receiving part, which is adapted to receive the light comes from the light-emitting part and reflected by a detected object to generate a light receiving signal; an output unit, which is adapted to process the light receiving signal to output a detection signal; and a control unit, which is adapted to control the driving pulse generating unit to generate a first driving pulse of a sleep cycle in usual, where the control unit is triggered by a variation of the detection signal to control the driving pulse generating unit to generate a specified number of second driving pulses of a duty cycle, and the duty cycle is formed by two or more specific cycles with different lengths, and an average of the two or more specific cycles is taken as a value of the duty cycle, and the duty cycle is shorter than the sleep cycle.

In one disclosure of the invention, the specific cycles include a first cycle and a second cycle with a length different to a length of the first cycle, and the first cycle and the second cycle are alternated. Alternatively, the specific cycles include a plurality of cycles with lengths sequentially becoming longer or shorter.

In one disclosure of the invention, the driving pulse generating unit includes a system clock generating unit, which is adapted to generate a system clock; a frequency dividing unit, which is controlled by the control unit to generate the first driving pulse and the second driving pulses according to the system clock; and a selection unit, which is controlled by the control unit to select the first driving pulse or the second driving pulses.

In one disclosure of the invention, the control unit determines lengths of the duty cycle and the sleep cycle according to a size of the detected object and a moving speed of the detected object.

In one disclosure of the invention, a ratio of the sleep cycle and the duty cycle is 10-15.

In one disclosure of the invention, the specified number is an integer of 4-8.

The invention provides a control method of a photoelectric sensor, and the control method is adapted to control the photoelectric sensor, where the photoelectric sensor includes a driving pulse generating unit, a light-emitting part, a light receiving part, an output unit and a control unit. The control method of the photoelectric sensor includes a driving pulse generating step: generating a driving pulse of different cycles by the driving pulse generating unit; a light-emitting step: receiving the driving pulse by the light-emitting part to emit a light corresponding to the driving pulse; a light receiving step: receiving the light which is from the light-emitting part and reflected by a detected object to generate a light receiving signal; an output step: processing the light receiving signal by the output unit to output a detection signal; and a driving pulse determination step: controlling the driving pulse generating unit by the control unit to generate a first driving pulse of a sleep cycle in usual, where the control unit is triggered by a variation of the detection signal to control the driving pulse generating unit to generate a specified number of second driving pulses of a duty cycle, and the duty cycle is formed by two or more specific cycles with different lengths, and an average of the two or more specific cycles is taken as a value of the duty cycle, and the duty cycle is shorter than the sleep cycle.

In one disclosure of the invention, the specific cycles include a first cycle and a second cycle with a length different to a length of the first cycle, and the first cycle and the second cycle are alternated. Alternatively, the specific cycles include a plurality of cycles with lengths sequentially becoming longer or shorter.

In one disclosure of the invention, the driving pulse generating unit includes a system clock generating unit, which is adapted to generate a system clock; a frequency dividing unit, which is controlled by the control unit to generate the first driving pulse and the second driving pulses according to the system clock; and a selection unit, which is controlled by the control unit to select the first driving pulse or the second driving pulses.

In one disclosure of the invention, the control unit determines lengths of the duty cycle and the sleep cycle according to a size of the detected object and a moving speed of the detected object.

In one disclosure of the invention, a ratio of the sleep cycle and the duty cycle is 10-15.

In one disclosure of the invention, the specified number is an integer of 4-8.

According to the above description, the invention provides the photoelectric sensor and the control method thereof capable of saving energy and having good anti-interference performance.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Embodiments of the invention are described below with reference of figures. A photoelectric sensor 1 of the invention is used for detecting a detected object with a larger volume on a production line.

Figure 1:
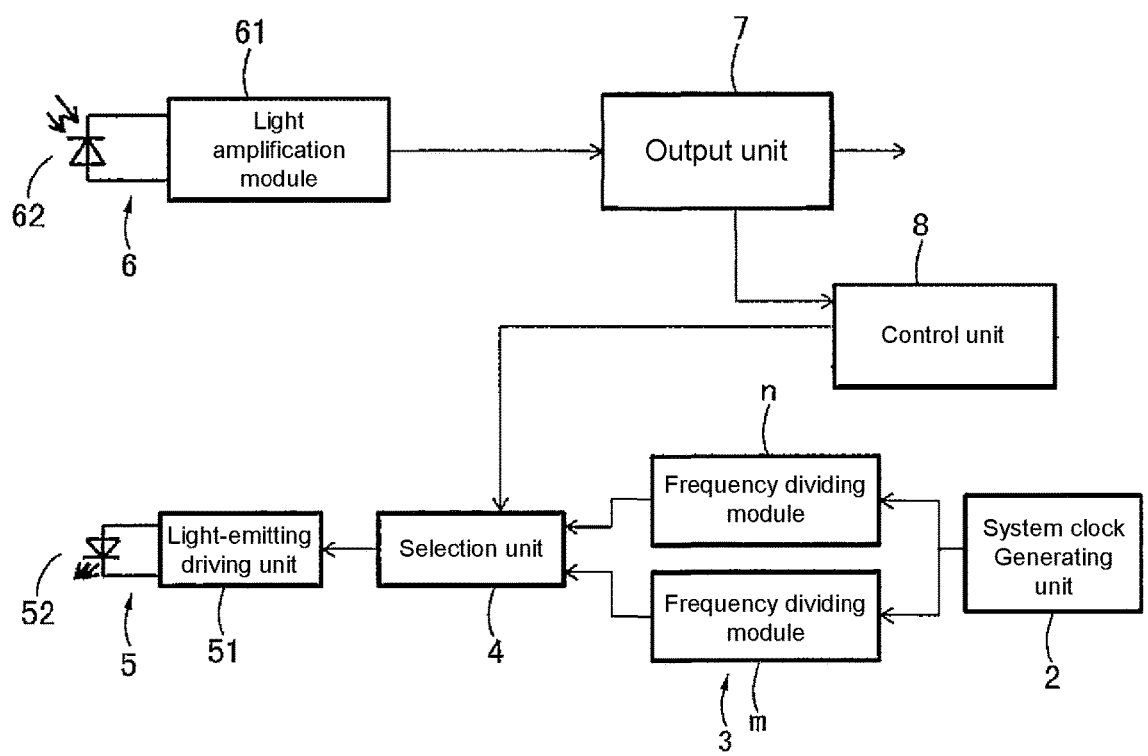
FIG. 1 is a block diagram of a whole structure of a photoelectric sensor according to an embodiment of the invention.

First, description is made with reference of a structure of the photoelectric sensor 1 of a first embodiment of FIG. 1.

FIG. 1 is a block diagram of a whole structure of the photoelectric sensor 1 according to the first embodiment of the invention.

The photoelectric sensor 1 of the first embodiment includes a system clock generating unit 2, which is adapted to generate system clock pulse signals with a same cycle and a same pulse width; a frequency dividing unit 3, which includes a frequency dividing module m and a frequency dividing module n, where the frequency dividing module m modulates the system clock pulse signal to produce a pulse signal with a periodically alternating duty cycle T1, and the frequency dividing module n modulates the system clock pulse signal to produce a pulse signal with a sleep cycle T2, where the duty cycle T1 is formed by a first cycle T11 and a second cycle T12 with a length different with that of the first cycle T11, and a value of the duty cycle T1 is an average of the first cycle T11 and the second cycle T12, and the sleep cycle T2 is longer than the duty cycle T1, the first cycle T11 and the second cycle T12. The photoelectric sensor 1 further includes a selection unit 4, which is controlled by a control unit 8 to select the pulse signal with a cycle of the duty cycle T1 or a pulse signal with a cycle of the sleep cycle T2 to serve as a driving signal for outputting; a light-emitting part 5, which includes a light-emitting element 52 capable of emitting light and a light-emitting driving unit 51 adapted to drive the light-emitting element 52; a light receiving part 6, which includes a light receiving element 62 used for receiving the light coming from the light-emitting element 52 and a light amplification module 61 used for amplifying a light receiving signal coming from the light receiving element 62; and an output unit 7, which is adapted to process the light receiving signal amplified by the light amplification module 61 to output a detection signal.

Operation of the photoelectric sensor 1 is described below with reference of FIG. 2. In the following description, a situation of stating the photoelectric sensor 1 in case that the detected object is located on an optical path between the light-emitting element 52 and the light receiving element 62 (which is referred to as a detecting optical path hereinafter) is described below.

Figure 2:
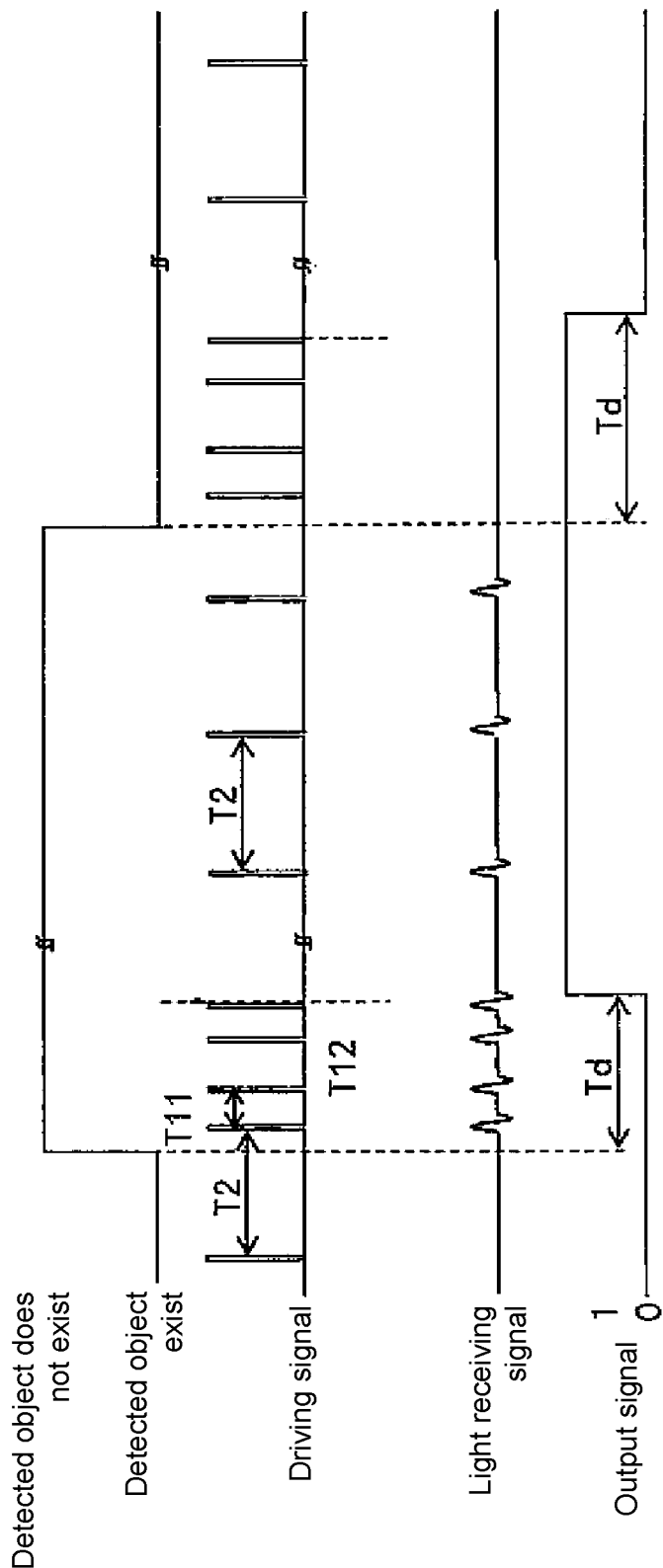
FIG. 2 is a timing diagram of an operation of the photoelectric sensor according to an embodiment of the invention.

FIG. 2 is a timing diagram of the operation of the photoelectric sensor 1. In FIG. 2, the output signal is delayed by a response time Td of the sensor relative to the light receiving signal.

When the photoelectric sensor 1 is started, the system clock generating unit 2 keeps generate the system clock pulse signal, and the frequency dividing module m generates the pulse signal of the duty cycle T1, and the frequency dividing module n generates the pulse signal of the sleep cycle T2.

Then, since the detected object exists on the detection optical path, the control unit 8 controls the selection unit 4 to select the pulse signal of the sleep cycle T2 to serve as the driving signal for outputting to the light-emitting driving unit 51, and the light-emitting driving unit 51 drives the light-emitting element 52 by the sleep cycle T2, such that the light-emitting element 52 emits light in the sleep cycle T2. By selecting the pulse signal of the long sleep cycle T2 to serve as the driving signal, an energy saving effect is achieved.

Since the detected object exists on the detection optical path, the light receiving element 62 is shielded and cannot receive the light coming from the light-emitting element 52, and the output unit 7 does not output the detection signal.

Along with movement of the detected object, when the detected object does not exist on the detection optical path, the light-receiving element 62 may receive the light coming from the light-emitting element 52, and now the output unit 7 outputs the detection signal.

Now, based on variation of a state of the detection signal of the output unit 7 (the detection signal is changed from a low level to a high level), the control unit 8 controls the selection unit 4 to select the pulse signal of the duty cycle T1 to serve as the driving signal for outputting to the light-emitting driving unit 51, and the light-emitting driving unit 51 drives the light-emitting element 52 by the duty cycle T1, such that the light-emitting element 52 emits light in the duty cycle T1. Now, since the detected object does not exist on the detection optical path, the light receiving element 62 may receive the light coming from the light-emitting element 52, and the output unit 7 outputs the detection signal.

When the light-emitting element 52 emits light in the duty cycle T1 by 4 times, and the output unit 7 outputs the detection signal corresponding to the driving signal by 4 times, the control unit 8 controls the selection unit 4 to select the pulse signal of the sleep cycle T2 to serve as the driving signal for outputting to the light-emitting driving unit 51, and the light-emitting driving unit 51 drives the light-emitting element 52 by the sleep cycle T2, such that the light-emitting element 52 emits light in the sleep cycle T2.

Then, the sleep cycle T2 is kept driving the light-emitting element 52 until the state of the detection signal output by the output unit 7 is varied. When there is no output signal corresponding to the driving signal, it represents that a new detected object is appeared on the detection optical path. Now, the light coming from the light-emitting element 52 is shielded by the detected object, and the light receiving element 62 cannot receive the light coming from the light-emitting element 52, such that the output unit 7 does not outputs the detection signal. Based on the variation of the state of the detection signal of the output unit 7, the control unit 8 controls the selection unit 4 to select the pulse signal of the duty cycle T1 to serve as the driving signal for outputting to the light-emitting driving unit 51, and the light-emitting driving unit 51 drives the light-emitting element 52 by the duty cycle T1, such that the light-emitting element 52 emits light in the duty cycle T1.

When the light-emitting element 52 emits light in the duty cycle T1 by 4 times, and the output unit 7 still does not output the detection signal corresponding to the driving signal by 4 times, the control unit 8 controls the selection unit 4 to select the pulse signal of the sleep cycle T2 to serve as the driving signal for outputting to the light-emitting driving unit 51, and the light-emitting driving unit 51 drives the light-emitting element 52 by the sleep cycle T2, such that the light-emitting element 52 emits light in the sleep cycle T2 until the state of the detection signal of the output unit 7 is again varied.

Then, the aforementioned operations are repeated.

In the aforementioned embodiment, only when the state of the detected object on the detection optical path (the state of the detection signal of the output unit) is varied, i.e. from a state with the detected object to a state without the detected object, or from the state without the detected object to the state with the detected object, the selection unit 4 selects the pulse signal of the duty cycle T1 which has a period shorter than the sleep cycle T2 to drive the light-emitting device 52 by the duty cycle T1, and the pulse signal is constructed by alternating a pulse signal with a cycle of the first cycle T11 and a pulse signal with a cycle of the second cycle T12 which has a length different to the length of the first cycle T11, and the sleep cycle T2 is longer than the first cycle T11 and the second cycle T12, and when the state of the detected object on the detection optical path is not changed in usual, the light-emitting element 52 is always driven in the sleep cycle. In this way, not only the power consumed by the light-emitting element is decreased to save energy, the duty cycle T1 is constructed by two different alternated cycles, such that compared with the situation that the duty cycle is a single cycle, an interference signal with a frequency that is the same with the single cycle can be eliminated, so as to improve a detection accuracy of the photoelectric sensor.

Moreover, time lengths of the duty cycle T1 and the sleep cycle T2 can be determined according to a length of the detected object and a moving speed of the detected object on a production line. For example, based on an average moving speed of the detected object, a time that the detected object with the shortest length passes through the photoelectric sensor 1 is a sum of the time of a plurality of (for example, 4 in the present embodiment) the duty cycles T1 and the time of a plurality of (for example, 4, 3, 5, or 10, etc.) the sleep cycles T2.

An example of pulse widths of the duty cycle T1 (the first cycle T11, the second cycle T12) and the sleep cycle T2 is provided below. A width of the driving signal is, for example, 2-2.5 microseconds (ms), the first cycle T11 is 30 ms, the second cycle T12 is 50 ms, and the sleep cycle T2 is 400 ms, if an average of the first cycle T11 and the second cycle T12 is taken as the value of the duty cycle T1, a ratio of the sleep cycle T2 and the duty cycle T1 is 10.

The values of the duty cycle T1 (the first cycle T11, the second cycle T12) and the sleep cycle T2 are only an example, and the ratio of the sleep cycle T2 and the duty cycle T1 is not limited to 10, which can be 10-15, and preferably 13. In this way, the photoelectric sensor may perform detection in good conditions.

Moreover, in the aforementioned embodiment, the duty cycle T1 is constructed by alternating the first cycle T11 and the second cycle T12, though the invention is not limited thereto.

Figure 3:
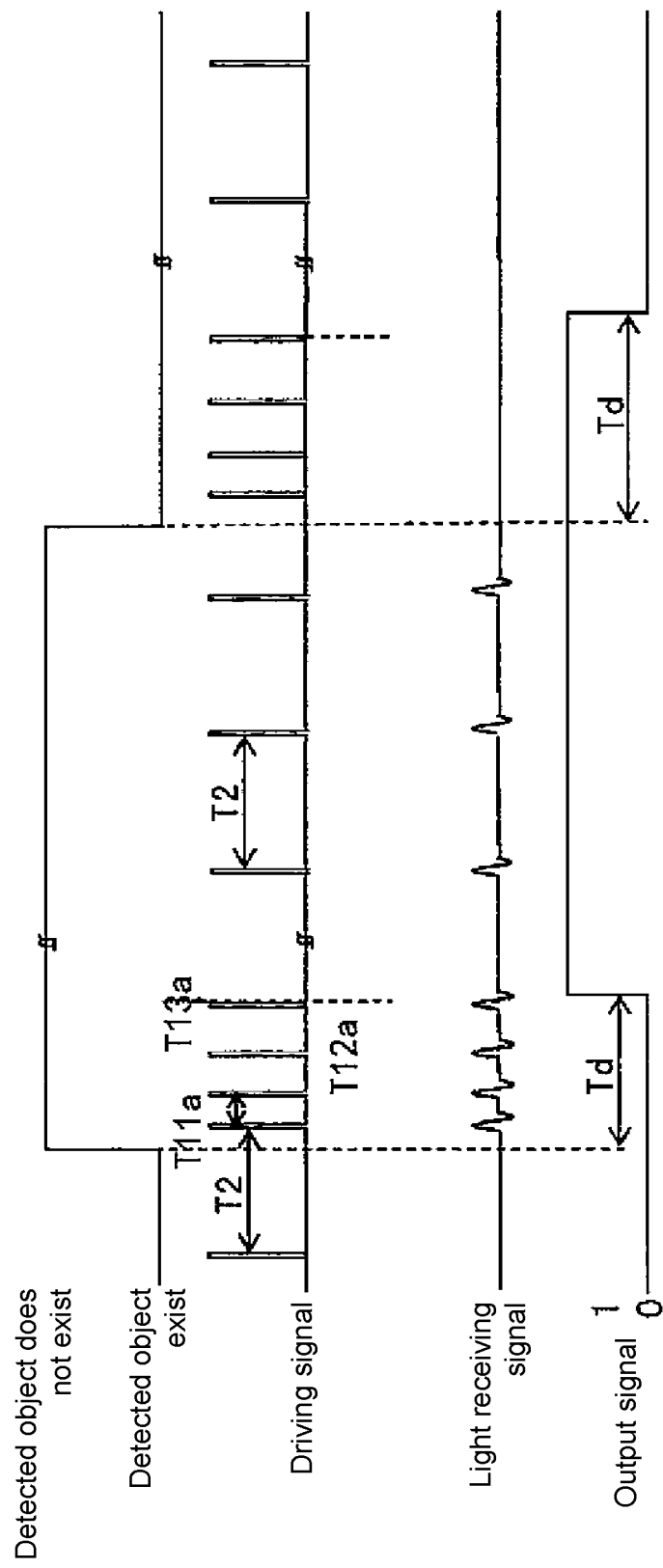
FIG. 3 is a timing diagram of an operation of the photoelectric sensor according to a variation example of the invention.

Variations of the invention are described below with reference of FIG. 3 and FIG. 4. FIG. 3 is a timing diagram of the operation of the photoelectric sensor according to a variation of the invention, and FIG. 4 is a timing diagram of the operation of the photoelectric sensor according to another variation of the invention.

As shown in FIG. 3, the frequency dividing unit 3 may further have a frequency modulation module (now shown) disposed in the downstream of the frequency dividing module m. In this case, the frequency dividing module m modulates the system clock pulse signal to produce the pulse signal with the same duty cycle, and the frequency modulation module modulates the pulse signal of the duty cycle to produce the pulse signal of the cycles T11a, T12a, T13a with lengths thereof sequentially becoming longer, and the duty cycle T1 is an average of the cycle T11a, the cycle T12a, the cycle T13a.

Figure 4:
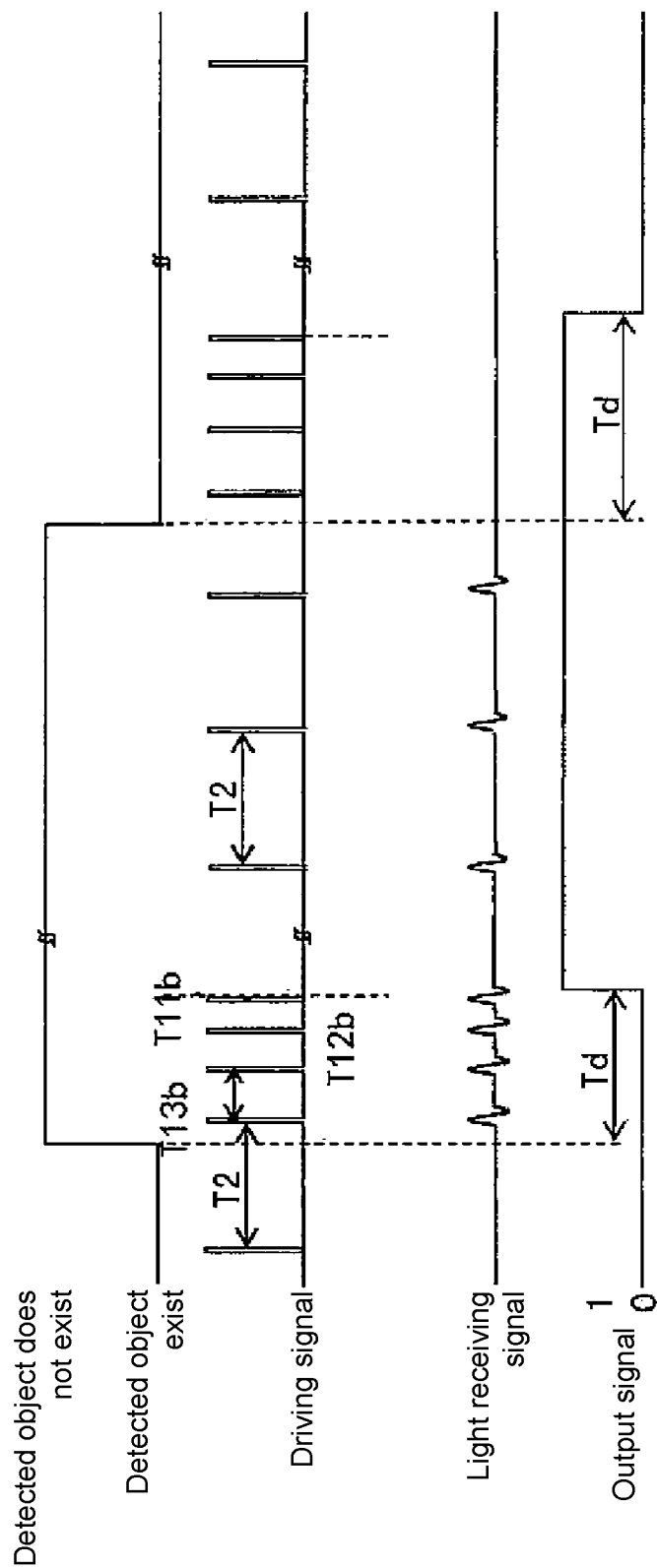
FIG. 4 is a timing diagram of an operation of the photoelectric sensor according to another variation example of the invention.

As shown in FIG. 4, the frequency dividing unit 3 may further have a frequency modulation module (now shown) disposed in the downstream of the frequency dividing module m. In this case, the frequency dividing module m modulates the system clock pulse signal to produce the pulse signal with the same duty cycle, and the frequency modulation module modulates the pulse signal of the duty cycle to produce the pulse signal of cycles T13b, T12b, T11b with lengths thereof sequentially becoming shorter, and the duty cycle T1 is an average of the cycle T13b, the cycle T12b, the cycle T11b.

In the aforementioned embodiment, taking a situation that when the output unit 7 continuously outputs 4 output signals corresponding to the duty cycle, the selection unit 4 selects the pulse signal with the cycle of the sleep cycle T2 to drive the light-emitting element 52 as an example for description, though the number of the output signals used for triggering the selection unit 4 to select the pulse signal of the sleep cycle T2 is not limited to 4, which is, for example, greater than 4, and is preferably 4-8. In this way, the photoelectric sensor may perform detection in good conditions.

In the aforementioned embodiment, the sleep cycles T2 are assumed to be equivalent, though the invention is not limited thereto, and the sleep cycles can be gradually increased, and when the light-emitting element emits light by 4 times and the state of the output signal is not changed, i.e. the state of the detected object is not changed, the sleep cycle is changed to a constant value. In this way, the detection accuracy is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A photoelectric sensor, comprising:
    a driving pulse generating unit, generating a driving pulse of different cycles;
    a light-emitting part, receiving the driving pulse to emit a light corresponding to the driving pulse;
    a light receiving part, receiving the light which is from the light-emitting part to generate a light receiving signal;
    an output unit, processing the light receiving signal to output a detection signal; and
    a control unit, controlling, when triggered by a variation of the detection signal, the driving pulse generating unit to generate a specified number of second driving pulses of a duty cycle, and otherwise controlling the driving pulse generating unit to generate a first driving pulse of a sleep cycle,
    wherein the duty cycle is formed by two or more specific cycles with different lengths, and an average length of the two or more specific cycles is taken as a value of a length of the duty cycle, and the length of the duty cycle is shorter than the length of the sleep cycle, and
    wherein the specific cycles comprise a first cycle and a second cycle with a length different to a length of the first cycle, and the first cycle and the second cycle are alternated.

2. The photoelectric sensor as claimed in claim 1, wherein the driving pulse generating unit comprises:
    a system clock generating unit, generating a system clock;
    a frequency dividing unit, controlled by the control unit to generate the first driving pulse and the second driving pulses according to the system clock; and
    a selection unit, controlled by the control unit to select the first driving pulse or the second driving pulses.

3. The photoelectric sensor as claimed in claim 1, wherein the control unit determines lengths of the duty cycle and the sleep cycle according to a size of a detected object and a moving speed of the detected object.

4. The photoelectric sensor as claimed in claim 3, wherein a ratio of the length of the sleep cycle and the length of the duty cycle is 10 to 15.

5. The photoelectric sensor as claimed in claim 1, wherein the specified number is an integer of 4 to 8.

6. A control method of a photoelectric sensor, adapted to control the photoelectric sensor, wherein the photoelectric sensor comprises a driving pulse generating unit, a light-emitting part, a light receiving part, an output unit and a control unit, the control method of the photoelectric sensor comprising:
    a driving pulse generating step for generating a driving pulse of different cycles by the driving pulse generating unit;
    a light-emitting step for receiving the driving pulse by the light-emitting part to emit a light corresponding to the driving pulse;
    a light receiving step for receiving the light which is from the light-emitting part by the light receiving part, so as to generate a light receiving signal;
    an output step for processing the light receiving signal by the output unit to output a detection signal; and
    a driving pulse determination step for controlling, when triggered by a variation of the detection signal, the driving pulse generating unit by the control unit to generate a specified number of second driving pulses of a duty cycle, and otherwise controlling the driving pulse generating unit to generate a first driving pulse of a sleep cycle, the duty cycle is formed by two or more specific cycles with different lengths, and an average length of the two or more specific cycles is taken as a value of a length of the duty cycle, and the length of the duty cycle is shorter than the length of the sleep cycle,
    wherein the specific cycles comprise a first cycle and a second cycle with a length different to a length of the first cycle, and the first cycle and the second cycle are alternated.

7. The control method of the photoelectric sensor as claimed in claim 6, wherein the driving pulse generating unit comprises:
    a system clock generating unit, generating a system clock;
    a frequency dividing unit, controlled by the control unit to generate the first driving pulse and the second driving pulses according to the system clock; and
    a selection unit, controlled by the control unit to select the first driving pulse or the second driving pulses.

8. The control method of the photoelectric sensor as claimed in claim 7, wherein the control unit determines lengths of the duty cycle and the sleep cycle according to a size of a detected object and a moving speed of the detected object.

9. The control method of the photoelectric sensor as claimed in claim 8, wherein a ratio of the length of the sleep cycle and the length of the duty cycle is 10 to 15.

10. The control method of the photoelectric sensor as claimed in claim 6, wherein the specified number is an integer of 4 to 8.

* * * * *